United States Patent
Clark et al.

[11] Patent Number: 5,921,017
[45] Date of Patent: Jul. 13, 1999

[54] LIVE BAIT TRANSPORTER

[76] Inventors: Dennis W. Clark, 2731 Main St., Pittsburgh, Pa. 15235; Kathleen Ann McDonald, 235 Lobingen Ave., North Braddock, Pa. 15104; James S. Seiler, Rte. 50, Rd. # 3, Avella, Pa. 15312

[21] Appl. No.: 08/837,482

[22] Filed: Apr. 18, 1997

Related U.S. Application Data

[60] Provisional application No. 60/015,539, Apr. 18, 1996.

[51] Int. Cl.⁶ .................................................. A01K 97/04
[52] U.S. Cl. .................................................. 43/57; 43/56
[58] Field of Search ..................... 43/56, 57; 261/121.2; 119/203

[56] References Cited

U.S. PATENT DOCUMENTS

| | | | |
|---|---|---|---|
| 724,739 | 4/1903 | Bourne | 43/56 |
| 821,040 | 5/1906 | Jones | 43/56 |
| 867,463 | 10/1907 | Yingling . | |
| 1,616,125 | 2/1927 | Holman | 43/56 |
| 2,159,718 | 5/1939 | Spiner | 43/56 |
| 2,244,457 | 6/1941 | Hartford | 43/56 |
| 2,550,533 | 4/1951 | Clark | 43/57 |
| 2,570,684 | 10/1951 | Jackson | 43/57 |
| 2,664,241 | 12/1953 | Sunday | 43/57 |
| 2,754,617 | 7/1956 | Schwartz | 43/57 |
| 2,767,510 | 10/1956 | Hopkins | 43/57 |
| 2,883,789 | 4/1959 | Schwartz | 43/57 |
| 2,963,814 | 12/1960 | Zabrocki | 43/56 |
| 3,217,444 | 11/1965 | Howard | 43/57 |
| 3,334,438 | 8/1967 | Fellers . | |
| 3,339,305 | 9/1967 | Smith . | |
| 3,407,529 | 10/1968 | Kellner . | |
| 3,449,855 | 6/1969 | Hassell . | |
| 3,820,272 | 6/1974 | Rowe et al. . | |
| 3,835,575 | 9/1974 | Kelley et al. . | |
| 4,000,577 | 1/1977 | Kelley . | |
| 4,261,131 | 4/1981 | Poffenberger . | |
| 4,757,636 | 7/1988 | Lambourn . | |
| 4,794,723 | 1/1989 | Arnold et al. . | |
| 4,936,043 | 6/1990 | Steele . | |
| 5,050,335 | 9/1991 | Hisey . | |
| 5,228,231 | 7/1993 | Larson . | |
| 5,267,410 | 12/1993 | Peyatt | 43/57 |
| 5,305,542 | 4/1994 | Phelps | 43/57 |
| 5,507,114 | 4/1996 | Stricker . | |

FOREIGN PATENT DOCUMENTS

| | | | |
|---|---|---|---|
| 488785 | 12/1952 | Canada . | |
| 569484 | 1/1959 | Canada | 43/57 |
| 536068 | 4/1922 | France . | |
| 58582 | 2/1912 | Switzerland | 43/57 |

OTHER PUBLICATIONS

Built–In Tank, Poplular Mechanics, Jul. 1959, p. 29.

*Primary Examiner*—Kurt Rowan
*Attorney, Agent, or Firm*—Richard C. Litman

[57] ABSTRACT

A transport device according to one embodiment including an inner foraminous submersible sectional basket for holding live bait/fish and an outer water filled receptacle having false bottom compartments for storing air supply equipment which maintains a continuous controlled flow of air into the water filled receptacle. Both the receptacle and basket have carrying strap handles. The sectional basket is divided by a foraminous separating wall into a large compartment for holding large fish and a small compartment for holding small fish and/or bait. According to a another embodiment the transport device includes a cylindrical housing having an inflatable air bladder and a container disposed in the housing. The container holds a volume of water and rests atop and compresses the air bladder. A tube having an end connected to the air bladder and extends into the container. At the opposite end of the tube is an air stone for diffusing air into the container. Live bait kept in the container will have prolonged life due to the aeration caused by air being forced out of the bladder under the pressure of the container atop the bladder.

15 Claims, 7 Drawing Sheets

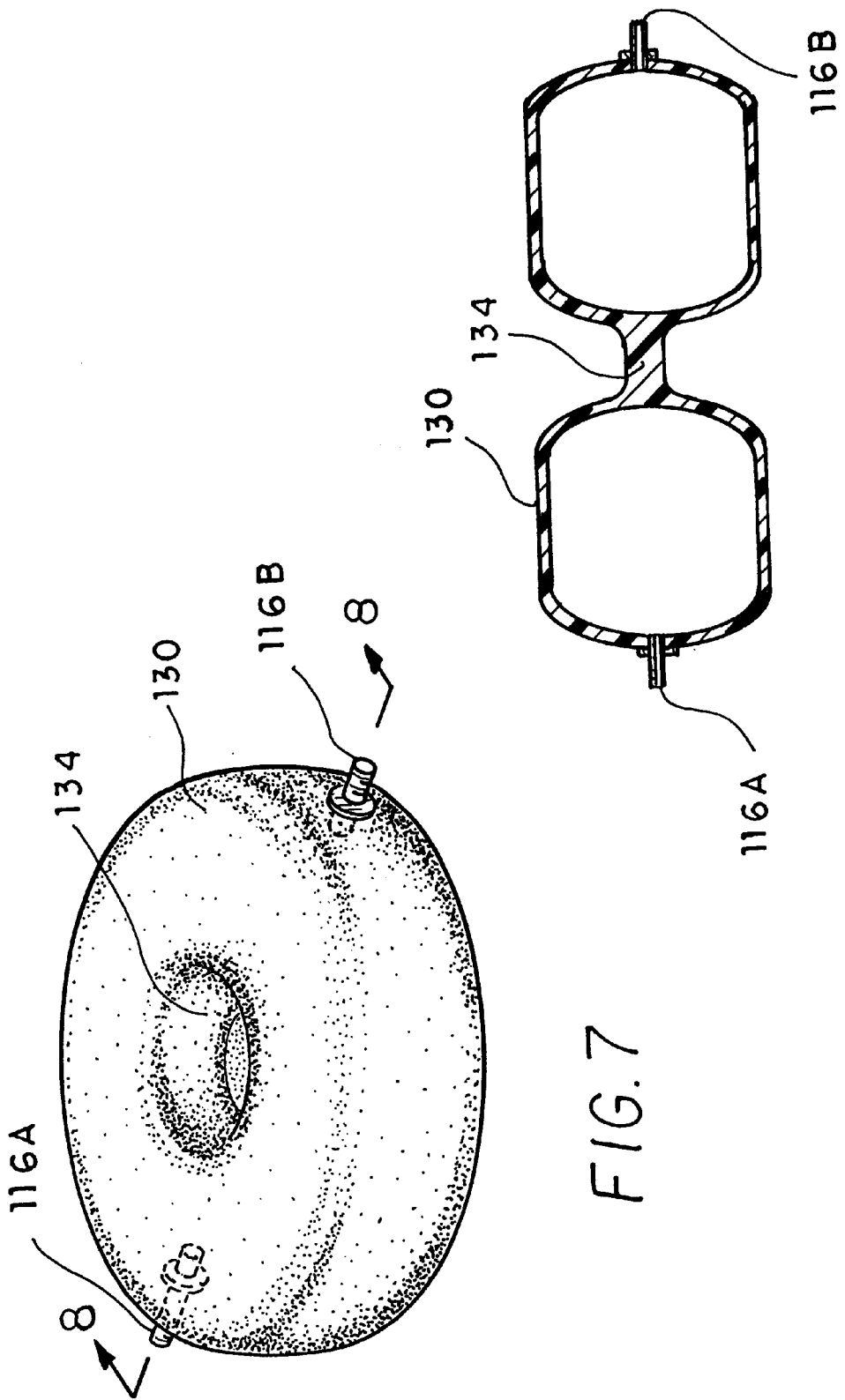

LIVE BAIT TRANSPORTER

CROSS-REFERENCE TO RELATED APPLICATION

This application claims the benefit of U.S. Provisional patent application Ser. No. 60/015,539, filed Apr. 18, 1996.

BACKGROUND OF THE INVENTION

1. Field of the Invention

The present invention relates to a bait transporter and more specifically to a bait transporter including a receptacle for holding live bait/fish in water and a compartment beneath the receptacle for storing oxygen supply equipment useful for maintaining a continuous controlled flow of air/oxygen to the water in the receptacle.

2. Description of Prior Art

To those who fish with live bait, it is common knowledge that the bait will die in the bait transport device in a short time if the water in the bait device is not changed frequently or if fresh air/oxygen is not supplied to the water in the bait device. It is a common occurrence for the live bait to die within a few hours from the time of purchase of the bait and, often, well before arrival at a remote fishing area. Bait transport devices are well known, as exemplified-by the following prior art.

U.S. Pat. No. 867,463, issued on Oct. 1, 1907 to Yingling, discloses a method and apparatus for preserving live fish. Yingling does not disclose a live bait transport device having an inner basket and an outer water filled receptacle having false bottom compartments for storing air supply equipment of the present invention.

U.S. Pat. No. 3,334,438, issued Aug. 8, 1967 to Fellers, discloses a minnow bucket having aeration for prolonging the life of the minnows contained therein. The bucket consists of an upper water tank for holding minnows, and a lower pressure chamber. The pressure chamber is filled with air at high pressure and is released into the upper water tank via a regulated tube.

U.S. Pat. No. 3,339,305, issued Sep. 5, 1967 to Smith, discloses a live bait bucket adapter. The adapter is frictionally positioned in the top of a bucket and has an inlet valve for receiving oxygen therein. The adapter provides an oxygen pocket above the water surface for absorption into the water, thereby providing oxygen to the bait.

U.S. Pat. No. 3,407,529, issued Oct. 29, 1968 to Kellner, discloses a device for transporting living fish having water tank surrounded by an air pillow cushion. The air pillow cushion is also used to provide the aeration to the water-contained. in the tank. The air pillow cushion is replenished by the carrying person by blowing through a tube or using waist mounted bellows.

U.S. Pat. No. 3,449,855, issued Jun. 17, 1969 to Hassell, discloses an oxygenated live bait container. The container has pressurized oxygen entrapped above the water and an access via a sliding sleeve to the bait.

U.S. Pat. No. 3,820,272, issued Jun. 28, 1974 to Rowe et al., discloses a water filled bait tank which is aerated with a compressed air bottle permitting filtered air to be metered into the tank through a porous air stone. Rowe et al. does not disclose a transport device having an inner foraminous basket for holding live bait/fish and an outer water filled receptacle having false bottom compartments for storing air supply equipment which maintains a continuous controlled flow of aeration throughout the device of the present invention.

U.S. Pat. No. 3,835,575, issued on Sep. 17, 1974 to Kelley et al., discloses a combination bait and tackle box characterized by a porous liner at the junctions of its vertical walls to preclude bait fish from crowding and suffocating. Kelley et al. does not disclose a transport device having an inner foraminous sectional basket for holding live bait/fish and an outer water filled receptacle of the present invention.

U.S. Pat. No. 4,000,577, issued on Jan. 4, 1977 to Kelley, discloses a fish bait box which is structurally arranged to be tilted to rest in various positions, thereby causing 1 displacement of the bait storage medium within the box and enabling easier removal of the bait from the box. Kelley does not disclose a live bait transport device having an inner foraminous basket and an outer water filled receptacle having false bottom compartments for storing air supply equipment of the present invention.

U.S. Pat. No. 4,261,131, issued Apr. 14, 1981 to Poffenberger, discloses a portable live bait container having an externally powered pump for aerating the water contained therein.

U.S. Pat. No. 4,757,636, issued Jul. 19, 1988 to Lambourn, discloses a insulated live bait bucket having a electrically powered pump source disposed in a false bottom of the bucket for aerating the water in the bucket.

U.S. Pat. No. 4,794,723, issued Jan. 3, 1989 to Arnold et al., discloses a floating bait bucket. The bucket has a perforated chamber for keeping the bait secure while maintaining the bait in the water. The bucket also includes an insulated compartment, a tackle box, and a receptacle for supporting a fishing rod or net.

U.S. Pat. No. 4,936,043, issued Jun. 26, 1990 to Steele, discloses a live bait tank in the form of a foam plastic chest having a solar cell for generating electric power and a pump for pumping the water through the air in the chest causing aeration.

U.S. Pat. No. 5,050,335 issued on Sep. 24, 1991 to Hisey, discloses a combination minnow and fish preserving container having a section for containing water and minnows and a section for containing water and fish on ice. Hisey does not disclose a live bait transport device having an inner foraminous basket and an outer water filled receptacle having false bottom compartments for storing air supply equipment which maintains a continuous controlled flow of aeration throughout the device of the present invention, U.S. Pat. No. 5,228,231, issued on Jul. 20, 1993 to Larson, discloses a bait container including a bucket having a cavity for holding water and the bait and a lid for lifting the bait from the water when the lid is moved to an opened position. Larson doses not disclose a live bait transport device having an inner foraminous basket and an outer water filled receptacle having false bottom compartments for storing air supply equipment which maintains a continuous controlled flow of aeration throughout the device of the present invention.

U.S. Pat. No. 5,507,114, issued Apr. 16, 1996 to Stricker, discloses a container for storing and preserving the life of worms for bait. The container has a cooling medium therein for maintaining the worms at a desired temperature.

Canadian Patent Number 488,785, issued on Dec. 16, 1952 to Santala et al., discloses a minnow bucket having air supply means for providing a flow of air through water of the bucket. Santala et al. does not disclose a transport device having an inner foraminous sectional basket for holding live bait/fish and an outer water filled receptacle of the present invention.

French Patent Document Number 536,068 dated Apr. 6, 1922, by Deselle, discloses various embodiments for aerating the water in a container. Deselle does not disclose a live bait transport device having an inner foraminous sectional basket and an outer water filled receptacle having false bottom compartments of the present invention.

None of the above inventions and patents, taken either singly or in combination, is seen to describe the instant invention as claimed.

SUMMARY OF THE INVENTION

Aquatic creatures have long been a source of bait and keeping them alive until needed has been a significant problem. The prior art, as discussed above, shows many attempts to keep bait alive however, the prior art fails to present a feasible, economical, and practical solution. Thus applicant has developed a device that according to one embodiment thereof provides a feasible, economical, and practical way of prolonging bait life for several hours without requiring separate mechanical or electrical implements. The present invention relates to a carrier having an inflatable air bladder for aerating water in a bait container. The significance is that the bladder, when inflated to maximum capacity, is under the compression by the bait container. With the proper control and regulation of the air flow forced from the bladder, the water in the bait container may be aerated for several hours. In addition, the bladder serves as a pressurized volume of air that is easily replaced if ruptured, thus minimizing the expense.

According to another embodiment, the present invention relates to a transport device which includes an inner foraminous submersible sectional basket for holding live bait/fish and an outer water filled receptacle having false bottom compartments for storing air supply equipment which maintains a continuous controlled flow of air into the water filled receptacle. Both the receptacle and basket have carrying strap handles. The sectional basket is divided by a removable foraminous separating wall into a large compartment for holding large fish and a small compartment for holding small fish and/or bait.

Accordingly, it is a principal object of the invention to provide a transport device for aquatic creatures used as live bait, having the ability to prolong the life of the bait without any external electrical or mechanical appliances.

It is another object of the invention to provide a live bait transport device having a self contained aeration system.

It is a further object of the invention to provide a live bait transport device having a self contained aeration system having a regulator for controlling the flow of air.

It is yet another object of the invention to provide a live bait transport device utilizing a replaceable inflatable bladder as the aeration source.

It is still yet another object of the invention to provide an air diffuser for maximizing the regulated air flow.

It is also a further object of the invention to provide a transport device having an inner foraminous sectional basket for holding live bait/fish and an outer water filled receptacle having false bottom compartments for storing air supply equipment which maintains a continuous controlled flow of aeration throughout the device.

It is another object of the invention to provide a live bait transport device having an inner basket and outer receptacle holding a supply of aerated water for maintaining the bait in a live condition.

It is a further object of the invention to provide a live bait transport device having false bottom compartments for storing air supply equipment for maintaining a continuous controlled flow of aeration throughout the device.

Still another object of the invention is to provide an aerated transport device for keeping bait alive while in transit to the fishing area and keeping the fish in good condition on the return trip.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 7 is a perspective view of a bladder of the second embodiment of the invention.

FIG. 8 is a cross sectional view of the bladder taken along the line 8—8 on FIG. 7.

Similar reference characters denote corresponding features consistently throughout the attached drawings.

DETAILED DESCRIPTION OF THE PREFERRED EMBODIMENTS

The present invention is a transporter or transport device which according to a first embodiment includes an inner foraminous submersible sectional basket for holding live bait/fish and an outer water filled plastic receptacle having false bottom compartments for storing air supply equipment which maintains a continuous controlled flow of air into the water filled receptacle. As was noted in the discussion of the prior art, aeration efficiency and accessibility to the various compartments or cavities of a transporter have been compromised by the prior art devices. The present invention is designed to avoid the disadvantages posed by the arrangements of the prior art devices and lessen the chance that the user of a transport device will be carrying dead bait to a remote fishing area.

Figure 1:
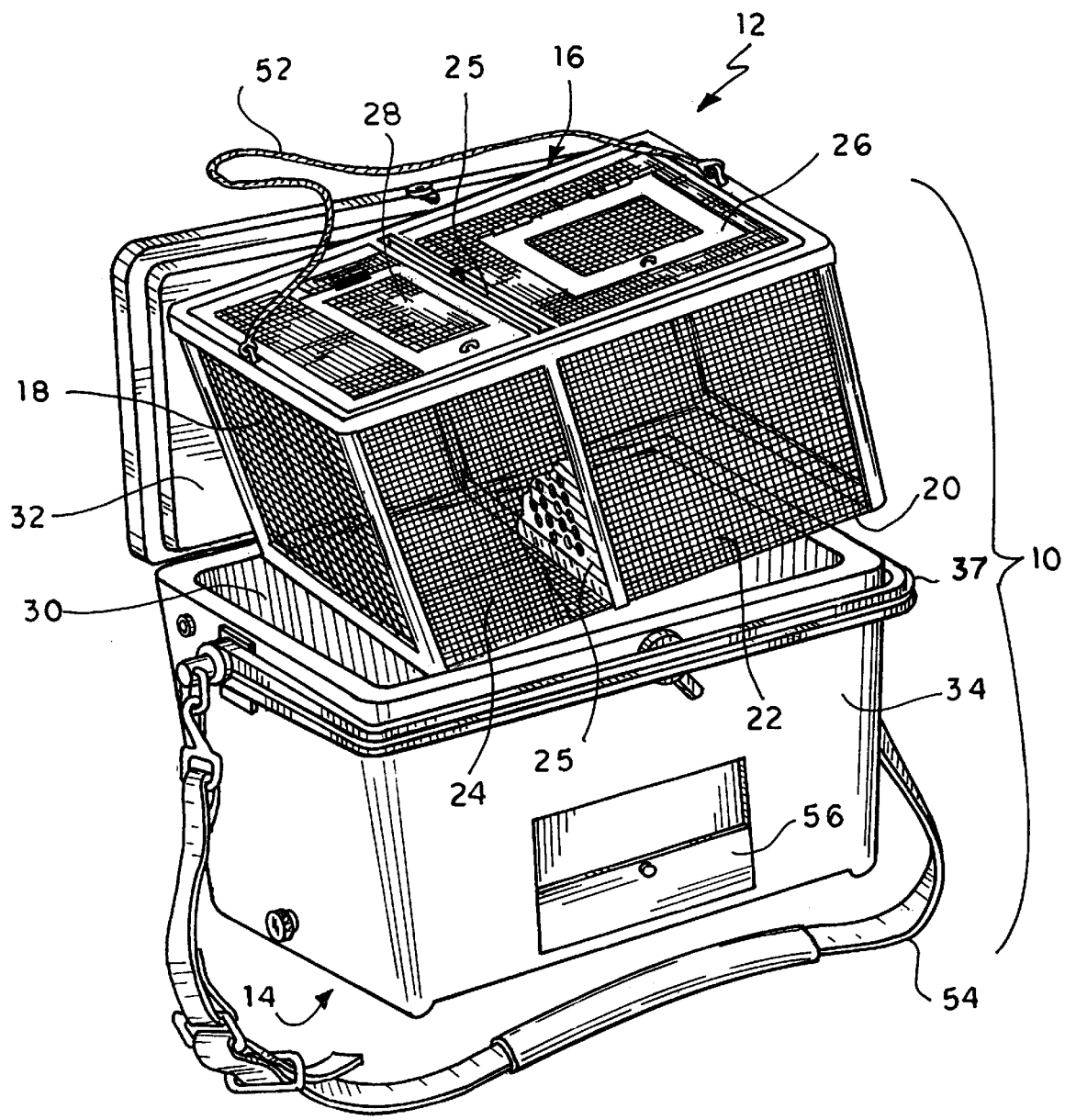
FIG. 1 is an environmental perspective view of the live bait transporter according to a first embodiment of the present invention.

Referring now to the figures by numerals of reference and first to FIGS. 1–4, a transport device 10 includes an inner foraminous or meshed basket 12 that is adapted to hold live bait and/or fish and an outer solid-walled plastic receptacle 14 that is adapted to be filled with fresh water. As seen in FIG. 1, the inner basket 12 readily fits into the outer receptacle 14. The inner foraminous basket 12 has a rectangular-box configuration and is smaller in size than the rectangular-box shaped receptacle 14. The basket 12 has a closed top 16, four sidewalls 18 and a bottom 20. The basket 12 comprises a first or right compartment 22 which is adapted to hold large fish and a second or left compartment 24 which is adapted to hold small fish and/or bait. The compartments 22 and 24 are separated by a removably mounted foraminous wall 25. The wall 25 may readily be removed through an opening in the top of the basket device. The closed top 16 has a first meshed door 26 and a second meshed door 28 for the first and second compartments 22, 24, respectively providing access thereto.

Figure 2:
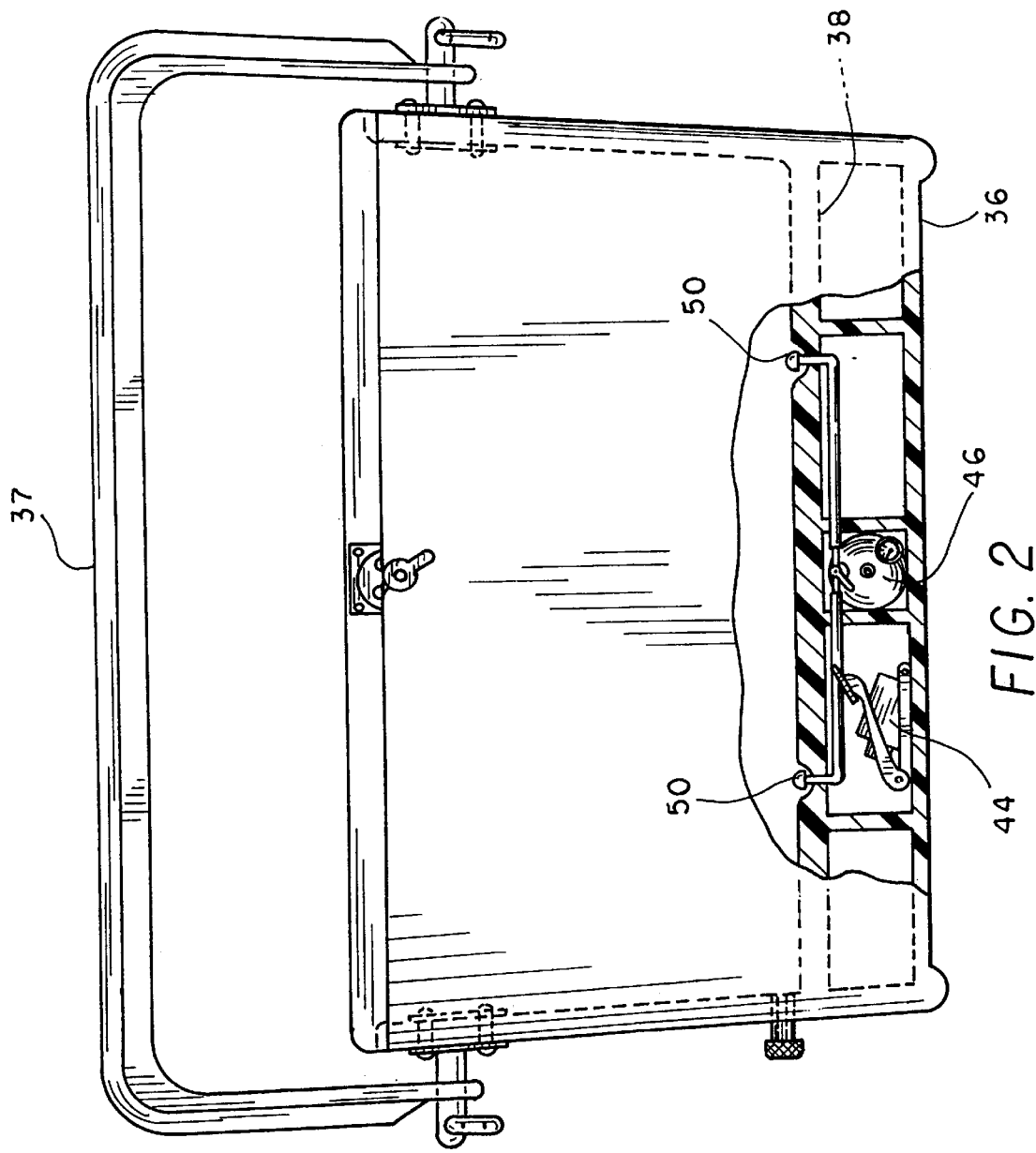
FIG. 2 is a front elevational view of the first embodiment with a portion of the outer container broken away to expose a plurality of compartments beneath a false bottom.
Figure 3:
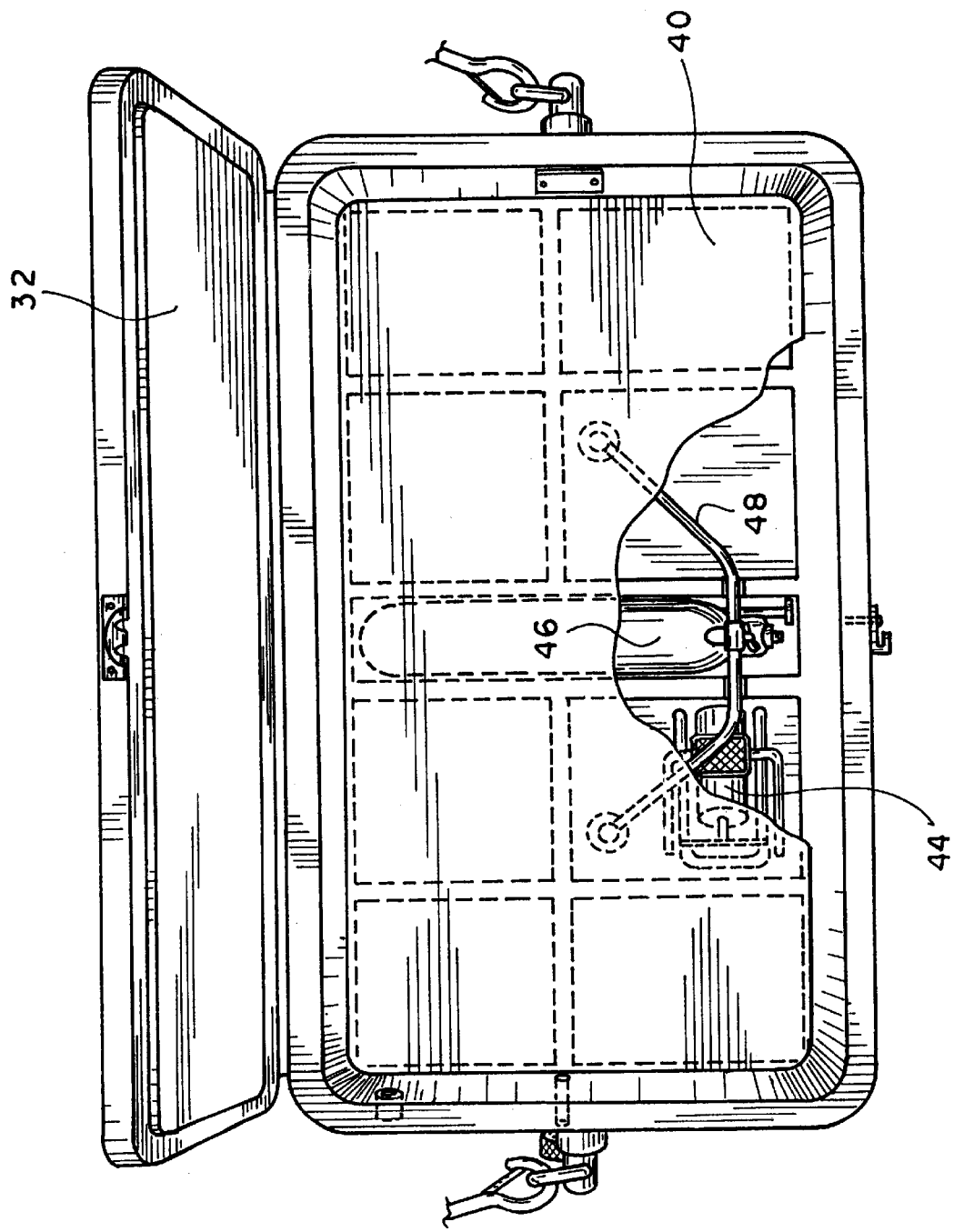
FIG. 3 is a top plan view of the live bait transporter of the first embodiment with a portion of the receptacle broken away to expose the compartments beneath the false bottom.

The solid-walled receptacle 14 has an open top 30, a pivotally mounted lid 32 for closing the top 30, four sidewalls 34 and a bottom 36. The receptacle 14 with a conventional U-shaped pivotally mounted handle 37 is similar to a plastic picnic cooler. The receptacle 14 comprises a solid-wall false bottom 38 which is located a short distance above the bottom 36 of the receptacle 14. Further, the receptacle 14 comprises a plurality of cavities located below the false bottom 38, as seen in FIGS. 2 and 3. There are a set of four cavities 40 of substantially equal volume on each side of an elongated cavity 42. One of the cavities 40 holds a small foot-operated hand pump 44. The elongated cavity 42 holds a bottle or tank 46 of compressed air. The other cavities 40 may store various diverse items. The pump 44 is similar to a conventional foot-operated bicycle tire pump. When the compressed air in the bottle 46 is reduced to a low pressure by a period of use, then an user of the transport device 10 can merely remove the foot-operated pump 44 from its cavity 40 and operate the foot-operated pump 44 to increase the pressure in the compressed air bottle 46 and thus, replenish the air required to aerate the receptacle 14, even in a remote geographical area. Also, the bottle 46 may be filled by a conventional air pump at a gasoline service station. The bottle 46 has suitable plumbing and controls 48 such as a pressure relief valve gauge, a valve stem for refilling and a ball valve for controlling the air flow, whereby the required amount of air is transferred from the bottle 46 at a normal continuous flow rate into the interior of the receptacle 14 to properly aerate the water within the receptacle 14. The control lines 48 include conventional air stones 50 located prior to entrance of the air into the receptacle 14.

Both the basket 12 and the receptacle 14 have carrying strap-type handles. The basket 12 has an elongated flexible handle 52, preferably made of nylon rope. As seen in FIG. 1, the rope handle 52 for basket 12 is attached to the top of a pair of the opposed sidewalls 18 for greater carrying capacity. The rope handle 52 may be removed and stored in one of the cavities 40. The receptacle 14 also has an elongated flexible handle that consists of an adjustable strap 54. The strap handle 54 for receptacle 14 is attached to the top of a pair of the opposed sidewalls 34. The receptacle 14 is provided with a door 56 near the bottom of the sidewall 34 of the receptacle to provide access to the cavities 40, 42 which store the foot-operated pump 44 and the air bottle 46, respectively.

Figure 5:
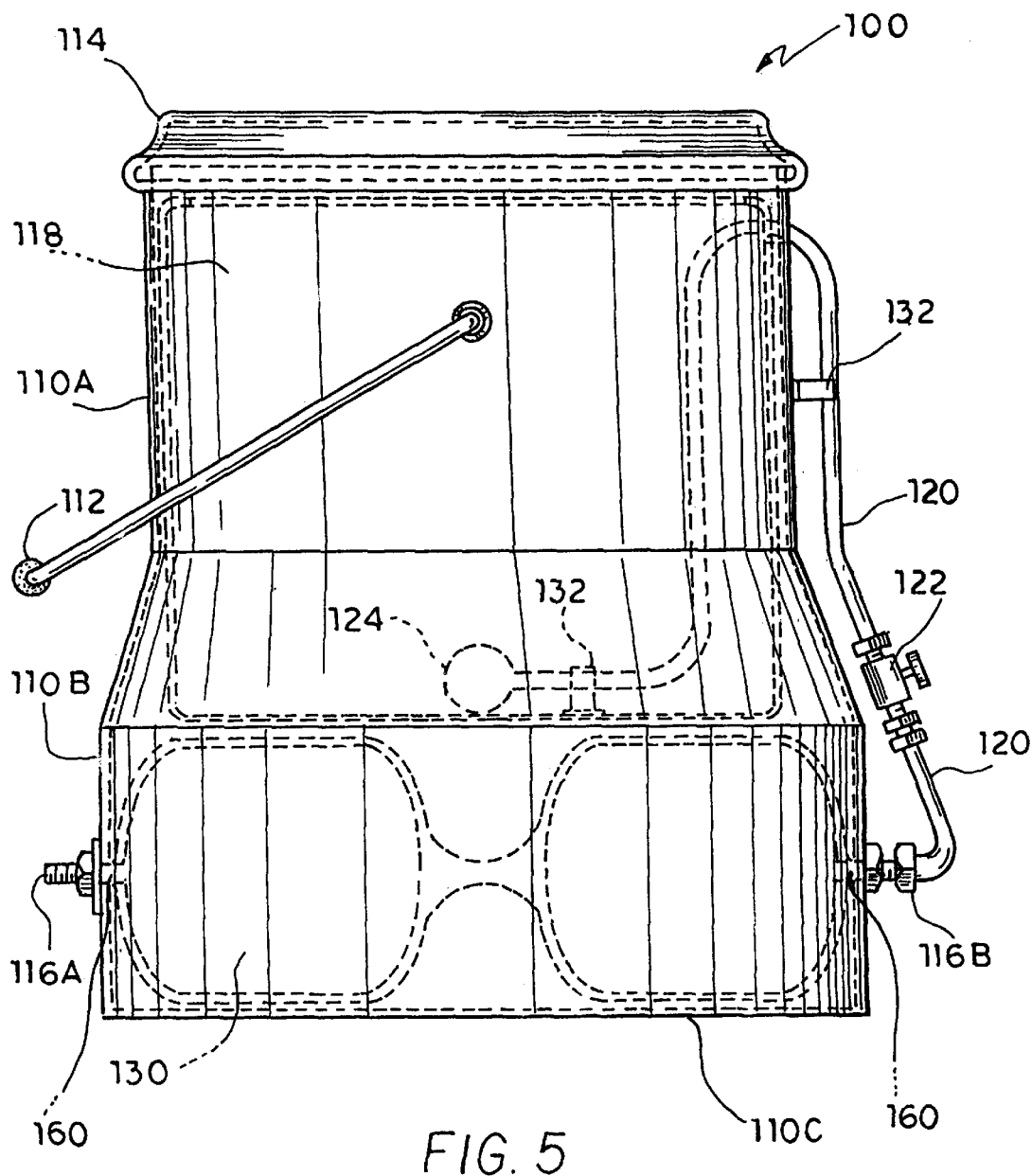
FIG. 5 is a side elevational view of the live bait transporter according to a second embodiment of the present invention.

Referring now to FIGS. 5–8, a preferred second embodiment is shown. This embodiment provides a live bait transport without requiring auxiliary mechanical or electrical appliances. Specifically, FIG. 5 shows the preferred embodiment of the invention generally designated as device 100. The device 100 is typically a carrier that has a generally cylindrical shape with an upper portion 110a and a lower portion 110b. The diameter of the upper portion 110a is less than the diameter of the lower portion 110b. Attached to the upper portion 110a is a handle 112 for carrying the device 100 easily. The upper portion 110a has a top rim 110D which may be sealed with a removable lid 114. Lid 114 is sealed in any conventional manner, such as snap top, thread engagement, etc. The lower portion 110b has a closed bottom 110c and openings or ports 160 through which air bladder valves 116a and 116b (discussed hereafter) extend.

An air tube or conduit 120 extends along the exterior of device 100 from the valve 116b through notches 150 and 152 (shown at FIG. 6) into an interior container 118. The free end of air tube 120 is terminated with an air diffuser, namely air stone 124. Intermediate the conduit 120 is a control regulator valve 122 (with or without a indicator gauge, not shown) for regulating the flow of air through the air tube 120. For stability of the conduit 120, one or more mounting clips 132 may be placed along the exterior of device 100, as well as along the interior of container 118.

The diameter of lower portion 110b is preferably greater than that of upper 110a, although the diameters may be equal, so as to reduce the possibility of the device 100 tipping over. For example, when fishing from a water-bourn vessel in choppy waters, the rocking and rolling may cause the center of gravity of device 100 to exceed the boundary (i.e., the diameter of the upper portion 110a if both portions had the same diameter) causing the device to tip over. The end result would be a loss of valuable bait, as well as a messy deck. By having a larger diameter lower portion 110b, device 100 becomes "sure-footed" and less likely to tip over.

Figure 6:
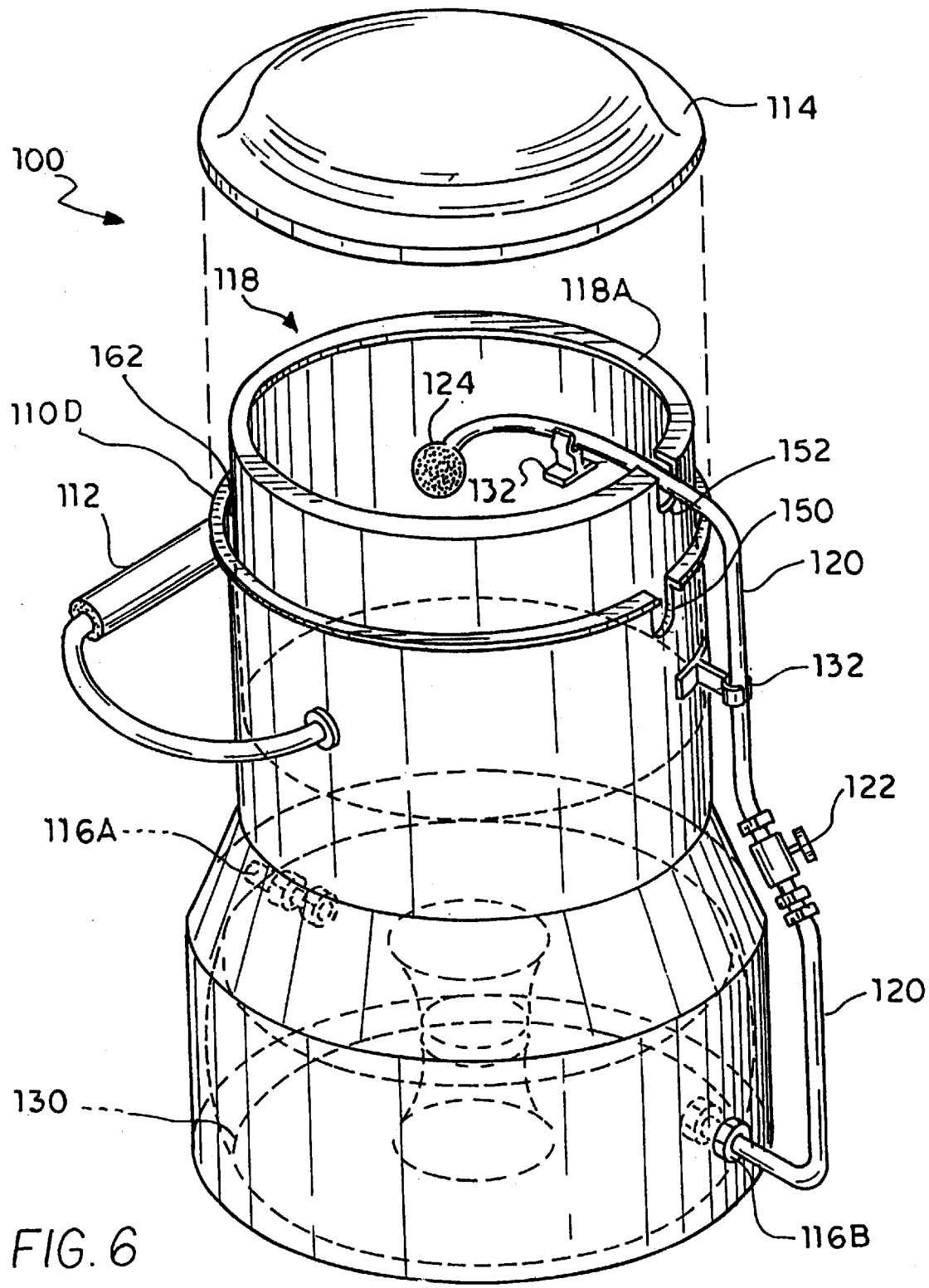
FIG. 6 is an exploded perspective view of the invention showing the independent parts of the second embodiment of the invention.

As can be seen in FIG. 6, the container 118 is slidably received in the upper portion 110a. The container 118 also rests atop an air bladder 130 contained in the lower portion 110b. The container 118 is filled with a volume of water in which the aquatic creatures used as live bait are kept. The container 118 along with the weight of the water and bait compress the air bladder 130. The compression of the air bladder 130 forces air through conduit 120 under control of valve 122. Thus, the air bladder 130 requires no auxiliary source, either electrical or mechanical, to aerate the water in container 118.

The control regulator valve 122 is disposed in the air tube 120 using conventionally known couplings which need not be shown or described. The regulator valve 122 allows the user to define the air flow rate through the air tube 120. By adequate control, the air displaced from the air bladder 130 under the compression of the container 118 may aerate the water in container 118 for several hours.

Referring now to FIGS. 7 and 8, the air bladder 130 is shown having a substantially doughnut-like shape and configuration. The center of the doughnut is preferably a closed webbing 134. Although the doughnut shape is disclosed, it is well within the knowledge of the skilled artisan to used any other suitable shape. The doughnut shape provides the air bladder 130 with a generally uniform surface upon which the container 118 rests. The central webbing 134 helps the air bladder 130 to expel the air in a uniform manner. This keeps the container 118 from becoming askew and/or lodged in the upper portion 110a, which would prevent normal, constant compression on the air bladder 130. Diametrically opposed on the air bladder 130 are air bladder valves 116a and 116b, which are conventional one-way self sealing valves. Any standard pump or air compressor can be connected to valve 116a and used to inflate the air bladder 130 to maximum capacity. At maximum capacity, the air bladder 130 provides several hours of air for aeration. Once inflated (and the pump or compressor is removed), air bladder valve 116a self-seals and the valve may optionally be capped (not shown). Air bladder valve 116b is connected via a conventional fitting to the end of conduit 120.

The conduit 120 receives air from air bladder 130 via the air bladder valve 116b. The control regulator valve 122 is turned so as to set the flow of air at a rate adequate to produce proper aeration of the water without expending all of the air in a rush. The end of air tube 120 is connected to an air stone 124. Air stone 124 is a commercially available item that diffuses an air stream into a plurality of tiny bubbles when immersed in water. The tiny air bubbles will aerate the water (i.e., promote dissolution of oxygen) so as to prolong the life of the aquatic creatures that are kept in the water. As the container 118 compresses the air bladder 130, and consequently slides deeper in the device 100, the end of conduit 120 having the air stone 124, secured to the internal bottom via clip 132, will move in unison. The conduit 120 has enough slack so as to follow the end into the upper portion 110a via the notch 150.

Figure 4:
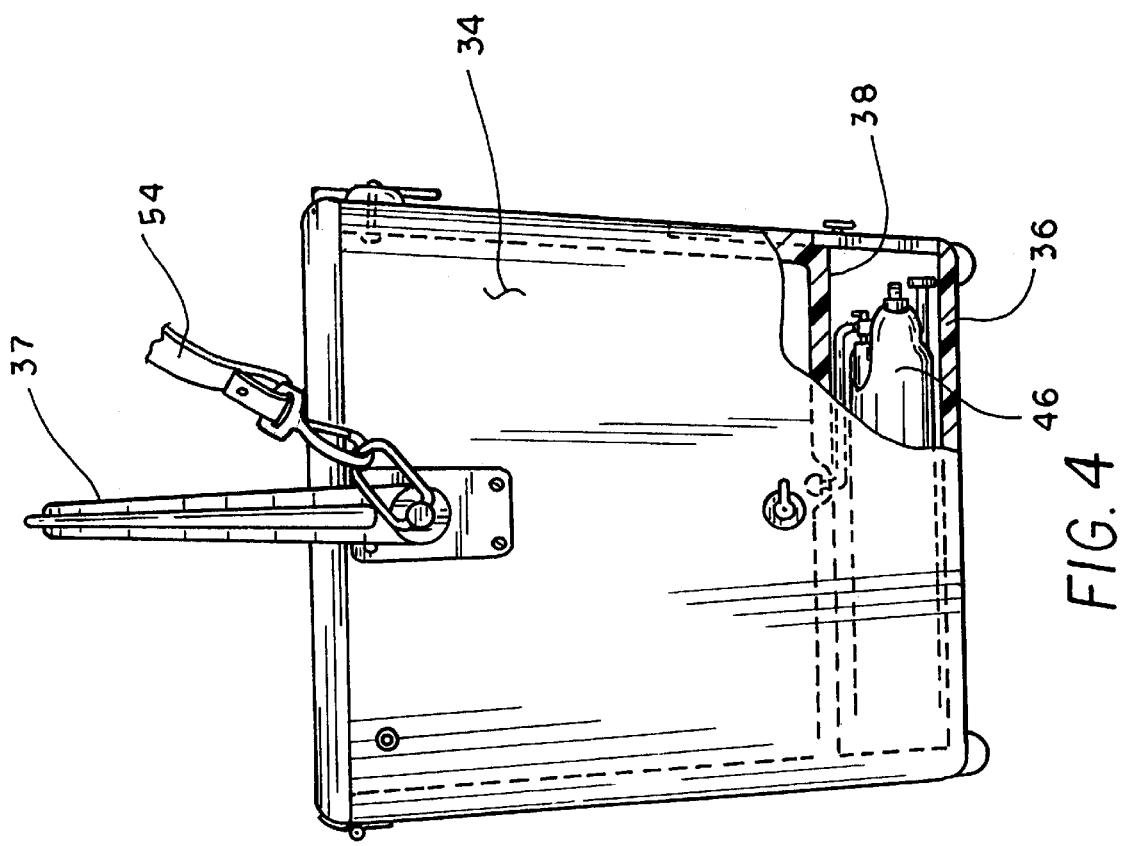
FIG. 4 is a partial fragmentary view of the live bait transporter of the first embodiment.

The device 100 is manufactured using sturdy, rigid, yet inexpensive materials, for example plastic, aluminum, etc. The air bladder 130 is made of a vinyl or rubber type material. The significance of the air bladder 130 is that the lower portion 110b of the device 100 need not be made as an expensive, high quality metal type pressure chamber. Further, the likelihood of the air bladder 130 rupturing is slight because the lower portion 110b serves as a protective shell, even if the lower portion 110b becomes damaged, the device 100 is still probably useable. Whereas, the impractical devices of the prior art, using high quality pressure chambers, the entire unit would have to be replaced upon the occurrence of the tiniest pin hole. This could be a costly expense. Whereas, the air bladder 130 is easily maintained, repairable and/or replaceable. It is also understood that the bladder 130 is self-deflating. That is, even without the compression of the container 118, bladder 130 will expel air through the tube 120 and diffuser 124. In addition, it is also understood that the air supply 46 of FIGS. 2–4 shown as a tank, can be an air bladder.

It is to be understood that the present invention is not limited to the embodiments described above, but encompasses any and all embodiments within the scope of the following claims.

we claim:

1. A transport device for prolonging the life of aquatic creatures used as bait, said device comprising:

carrier means having a closed bottom and an open top;

a pair of ports in said carrier means adjacent said closed bottom;

said open top including a top rim and a notch;

lid means for coupling to said rim for removably sealing said carrier means;

air bladder means removably disposed in said carrier means adjacent said closed bottom, said air bladder means being inflatable with a volume of air and having an input valve and an output valve extending through said pair of ports in said carrier means;

container means for holding a volume of water, said container means being removably disposed in said carrier means and having a closed bottom and an open top, said open top of said container means having a rim and a notch, said notch of said container means being aligned with said notch of said carrier means;

air tube means having a first end and a second end, said first end coupled to said output valve, said air tube means extending along said carrier means and through said notch of said carrier means, extending through said notch of said container means and said second end coupled to said closed bottom of said container means; and air stone diffuser means coupled to said second end of said air tube means;

wherein said volume of water held in said container means maintains the aquatic creatures used as bait, said container with said volume of water compresses said bladder forcing the air inflated therein through said output valve, said air tube means, said air stone diffuser means and into said volume of water for prolonging the life of the aquatic creatures used as bait.

2. The device according to claim 1, further comprising regulator means disposed in said air tube means at a position intermediate said first and second ends;

whereby said regulator means is accessible externally of said carrier means for controlling the flow of air in said container means.

3. The device according to claim 2, said air bladder means having a doughnut shape and said input and output valves being diametrically opposed on said air bladder means.

4. The device according to claim 1, further comprising:

regulator means disposed in said air tube means at a position intermediate said first and second ends;

whereby said regulator means is accessible externally of said carrier means for controlling the flow of air in said container means.

5. A live bait transport device comprising:

an outer generally cylindrical receptacle having an upper portion having a first diameter and lower portion having a second diameter, said first diameter being equal to or less than said second diameter;

said receptacle having a rim forming an open top, a lid for closing said top, a cylindrical sidewall and a bottom;

said receptacle having at least one notch in said rim;

said receptacle having at least one port extending through said lower portion;

an inner generally cylindrical container having a third diameter, said third diameter being less than said first diameter so that said inner cylindrical container is slidingly received within said upper portion and for holding a predetermined volume of water;

said inner container having a rim, said rim of said inner container having at least one notch therein, said at least one notch of said inner container rim being coincident with said at least one notch of said outer receptacle rim;

an aeration supply being disposed within said lower portion and being in direct communication with said at least one port; and conduit means coupled to said at least one port and extending into said inner container;

whereby said aeration supply maintaining a continuous controlled flow of air into the inner container via said conduit means.

6. The device according to claim 5, further comprising:

a handle attached to said outer receptacle for carrying said receptacle.

7. The device according to claim 5, further comprising:

a stone aspirator coupled to an end of said conduit means, said stone aspirator diffusing air from said aeration supply through said conduit means into a volume of water contained in said container.

8. The device according to claim 7, further comprising:

regulation means disposed in said conduit means at a position intermediate said end and another end, said regulation means being accessible externally of said outer receptacle for controlling the rate of diffusion of air in said container.

9. The device according to claim 7, wherein said at least one port includes an intake port and an output port, said output port being coupled to said conduit means.

10. The device according to claim 7, wherein said aeration supply includes an inflatable bladder having an inlet and an outlet, said inlet is coupled to said intake port and said outlet is coupled to said output port;

wherein said inflatable bladder providing the air at said output port while being compressed and deflated by said container;

wherein said conduit means extends into said container via said coincident notches in said container and said outer receptacle.

11. The device according to claim 5, further comprising:

regulation means disposed in said conduit means at a position intermediate said end and another end, said regulation means being accessible externally of said outer receptacle for controlling the flow of air in said container.

12. The device according to claim 11, wherein said at least one port includes an intake port and an output port, said output port being coupled to said conduit means.

13. The device according to claim 11, wherein said aeration supply includes an inflatable bladder having an inlet and an outlet, said inlet is coupled to an intake port and said outlet is coupled to said at least one port;

wherein said inflatable bladder providing air at said output port while being compressed and deflated by said container; and wherein said conduit means extends into said container via said coincident notches in said container and said outer receptacle.

14. The device according to claim 5, wherein said at least one port includes an intake port and an output port, said output port being coupled to said conduit means.

15. The device according to claim 14, wherein said aeration supply includes an inflatable bladder having an inlet and an outlet, said inlet is coupled to said intake port and said outlet is coupled to said output port;

wherein said inflatable bladder providing air at said output port while being compressed and deflated by said container; and wherein said conduit means extends into said container via said coincident notches in said container and said outer receptacle.

* * * * *